US009237271B2

(12) United States Patent
Campbell

(10) Patent No.: US 9,237,271 B2
(45) Date of Patent: Jan. 12, 2016

(54) EDGE-BASED ELECTRONIC IMAGE STABILIZATION

(71) Applicant: GoPro, Inc., San Mateo, CA (US)

(72) Inventor: Scott Patrick Campbell, Belmont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 14/536,338

(22) Filed: Nov. 7, 2014

(65) Prior Publication Data

US 2015/0062360 A1 Mar. 5, 2015

Related U.S. Application Data

(63) Continuation of application No. 13/610,483, filed on Sep. 11, 2012, now Pat. No. 8,913,141.

(60) Provisional application No. 61/665,681, filed on Jun. 28, 2012.

(51) Int. Cl.
H04N 5/232 (2006.01)

(52) U.S. Cl.
CPC ................................ H04N 5/23267 (2013.01)

(58) Field of Classification Search
CPC .......... H04N 5/23248; H04N 5/23258; H04N 5/23254; H04N 5/23287; H04N 5/23264; H04N 5/23267; G03B 5/00; G02B 27/646
USPC ........... 348/208.99, 208.1, 208.2, 208.4, 154, 348/155, 208.13, 352, 208.6
See application file for complete search history.

(56) References Cited

U.S. PATENT DOCUMENTS

| 6,285,804 | B1 | 9/2001 | Crinon et al. |
| 7,564,902 | B2* | 7/2009 | Sasai ...................... H04N 7/014 348/411.1 |
| 8,009,872 | B2 | 8/2011 | Kurata |
| 8,169,537 | B2 | 5/2012 | Ohki |
| 8,446,477 | B2 | 5/2013 | Irisawa et al. |
| 8,553,037 | B2 | 10/2013 | Smith et al. |
| 8,649,628 | B2 | 2/2014 | Albu et al. |
| 8,711,230 | B2 | 4/2014 | Matsunaga |
| 8,723,969 | B2* | 5/2014 | Garg .................. H04N 5/23248 348/208.1 |
| 2005/0157949 | A1* | 7/2005 | Aiso ..................... G06T 3/0056 382/299 |
| 2011/0254983 | A1 | 10/2011 | Siddiqui et al. |

OTHER PUBLICATIONS

United States Office Action for U.S. Appl. No. 13/610,483, May 22, 2014, 9 pages.

* cited by examiner

Primary Examiner — Nhan T Tran
Assistant Examiner — Chan Nguyen
(74) Attorney, Agent, or Firm — Fenwick & West LLP

(57) ABSTRACT

An image stabilization system applies a "pinned-edge" or "soft pinned edge" image stabilization technique to digital video to compensate for unwanted camera motion in a captured video. In these stabilization techniques, a warping function is applied to an image frame to achieve a non-uniform shifting of depicted points in the image frame such that a reference point is stabilized with respect to a reference frame. In pinned-edge image stabilization, the final stabilized output video has the same dimensions as the pre-stabilized input video captured by the image sensor. In soft pinned-edge image stabilization, the pre-stabilized input video has slightly larger dimensions than the stabilized output video but these larger dimensions are still reduced compared to traditional electronic image stabilization.

21 Claims, 9 Drawing Sheets

EDGE-BASED ELECTRONIC IMAGE STABILIZATION

RELATED APPLICATION

This application is a continuation of U.S. patent application Ser. No. 13/610,483 entitled "Edge-Based Electronic Image Stabilization" to Scott Patrick Campbell filed on Sep. 11, 2012, which claims the benefit of U.S. Provisional Patent Application No. 61/665,681 entitled "Edge-Based Electronic Image Stabilization" to Scott Patrick Campbell filed on Jun. 28, 2012, the contents of which are each incorporated by reference herein.

BACKGROUND

1. Technical Field

This disclosure relates to digital video processing, and more specifically to electronic image stabilization.

2. Description of the Related Arts

Electronic image stabilization (EIS) is a digital image processing technique that compensates for unwanted camera motion during digital video capture. In conventional electronic image stabilization (EIS), an image sensor captures a buffer frame that is significantly larger than the desired field of interest. The buffer frame is then processed to detect and extract the portion of the buffer frame corresponding to the desired field of interest. For example, a conventional buffer frame may have a height and width approximately 10% larger than the field of interest. This means that about 21% of the captured pixels in each frame will end up being discarded following EIS. These additional pixels substantially add to the total count of pixels that are read from the image sensor and processed by the digital signal processor (DSP) and substantially affect bandwidth requirements of the image sensors and DSPs. Furthermore, capturing these additional pixels uses up additional power which can lead to thermal problems with the camera electronics and drain the camera battery more quickly than desired.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

Figure (or "FIG.") 1 is a block diagram of an embodiment of an image stabilization system.

DETAILED DESCRIPTION

Figure 1:
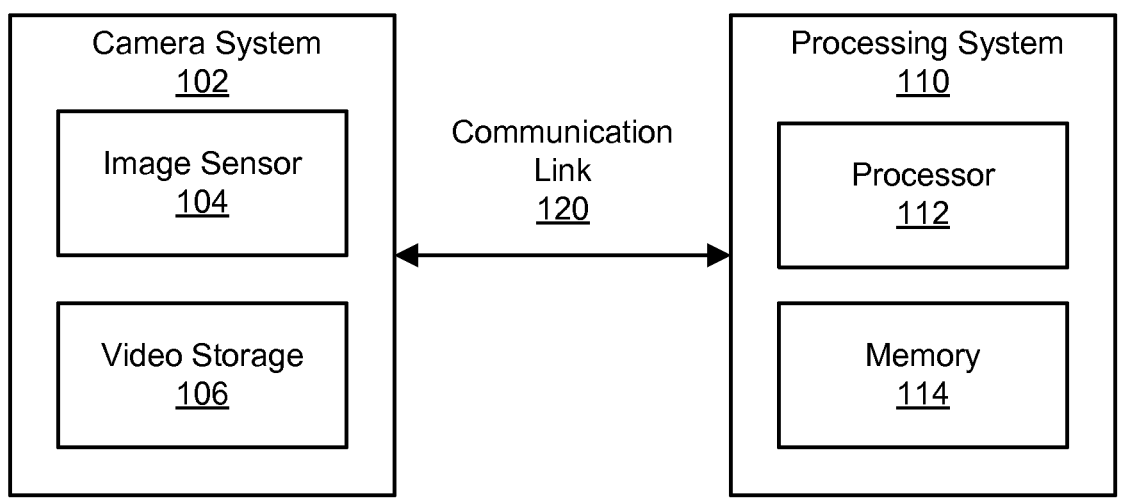

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview of Example Embodiments

An image stabilization system captures and stabilizes digital video. The image stabilization system includes a camera system for capturing digital video and an image processing system for performing stabilization. Digital video is received comprising a sequence of frames depicting a scene. The sequence of frames includes a reference frame and a second frame which each depict a common plurality of depicted points in the scene. A reference point is determined from the common plurality of points. The reference point corresponds to different pixel locations in the reference image and the second image (e.g., due to camera motion between capturing the images). A warping function is applied to the second frame of the digital video to generate a warped second frame. Depicted points of the depicted scene in the warped second frame are shifted non-uniformly relative to corresponding depicted points in the second image. Applying the warping function decreases depicted movement of the reference point between the reference frame and the second frame, resulting in a stabilized image.

In one embodiment, the amount of shift applied to depicted points between an edge of the second frame and the reference point varies linearly with distance from the edge of the second frame. In another embodiment, an amount of shift applied to depicted points along a line between an edge of the second frame and the reference point varies non-linearly with distance from the edge of the second frame.

In one embodiment, a soft pinned-edge stabilization technique is applied. For example, in one embodiment a first shift having a component in a first direction is applied to a non-edge point. A second shift is applied to an edge point. The non-edge point is shifted by a greater amount in the first direction than the edge point. In one embodiment, the first direction comprises a direction perpendicular to the edge of the second frame.

In another embodiment, a pinned-edge stabilization technique is applied. For example, in one embodiment, a first shift having a component in a first direction is applied to a non-edge point. No shift is applied to an edge point in the first direction. In one embodiment, the first direction comprises a direction perpendicular to the edge of the second frame.

Image Stabilization System

FIG. 1 illustrates an embodiment of an image stabilization system 100 for performing image stabilization. The image stabilization system 100 comprises a camera system 102 and a processing system 110 coupled by a communication link 120. In one embodiment, the camera system 102 and processing system 110 may be embodied within the same apparatus. Alternatively, the camera system 102 and processing system 110 may be in separate devices such as, for example, a camera device and a computing device respectively. In alternative embodiments, the image stabilization system 100 may include different or additional elements.

The camera system 102 comprises an image sensor 104 and a video storage 106. Other optional components of the camera system 102 such as control interfaces, display screen, etc. are omitted from the figure for clarity of description. The image sensor 104 captures digital video. The digital video comprises a sequence of frames (or images), with each frame comprising a two-dimensional array of pixels. The captured frames depict a "scene," which may include, for example, landscape, people, objects, etc represented by the captured pixels. Each pixel represents a depicted point in a scene captured in the digital video. Furthermore, each pixel is located at a pixel location, referring to, for example, (x,y) coordinates of the pixel within the frame. For example, a pixel may comprise {Red, Green, Blue} (RGB) values describing the relative intensities of the colors sensed by the image sensor 104 at a particular set of (x,y) coordinates in the frame. In various embodiments, the image sensor 104 may capture video suitable for providing output videos having high definition resolutions (for example, 1080p, 960p, or 720p), standard definition resolutions, or other resolutions. The image sensor 104 may capture video at various frame rates such as, for example, 120 frames per seconds (FPS), 60 fps, 48, fps, or 30 fps, although other frame rates may also be used. Additionally, the image sensor 104 may include a lens that allows for wide-angle or ultra wide-angle video capture having fields of view of, for example, 90 degrees, 127 degrees, or 170 degrees, although other field of view angles may also be used.

In one embodiment, the image sensor 104 captures images having larger dimensions (additional pixels) than the dimensions of the field of interest (i.e., the scene the user attempts to capture). In this embodiment, the additional pixels are utilized in soft pinned-edge image stabilization or standard stabilization described in further detail below. In another embodiment, the image sensor 104 captures an image having the same dimensions as the desired field of interest as may be used in pinned-edge image stabilization.

Image frames captured by the image sensor 102 may be temporarily or permanently stored in the video storage 106 which may comprise, for example, a hard drive or a solid-state memory device (e.g., a memory card or universal serial bus (USB) memory device). Alternatively, the video storage 106 may be omitted and the image sensor 102 may instead communicate the captured data directly to the processing system 110 via the communication link 120.

If the image sensor 104 is not completely stable when capturing video, the resulting video will appear as being unstable. This may appear, for example, as a "shaky" or "jittery" video in which depicted points that are stationary in the real-life scene appear to move in the captured video. For example, a stationary object that is centered in a first frame of the video may be off-centered in a second frame of the video due to motion of the image sensor between capturing the first and second frames. More generally, a stable point captured as a pixel at a pixel location $(x_1, y_1)$ in a first frame, may appear in a second frame as a pixel captured at a different pixel location $(x_2, y_2)$. Additionally, objects that are in motion during video capture may appear to have a motion that is distorted in the captured video relative its true motion. Such unstable video is a common result whenever the camera is held by hand or mounted to a moving object, and can be particularly problematic when attempting to capture action shots such as, for example, video captured while walking, running, driving, biking, surfing, etc.

Captured video is transferred to the image processing system 110 via the communication link 120 which may be a wired or wireless link. The image processing system 110 applies image stabilization to the captured video to compensate for unwanted camera motion. Thus, for example, the image processing system 110 may process the video such that stationary objects in the captured scene appear as stationary in the stabilized output video or at least have reduced movement relative to the un-stabilized captured video. In various embodiments, the image processing system 110 may apply image stabilization to account for horizontal camera movement, vertical camera movement, forwards/backwards motion or a combination. Furthermore, the image processor 106 may apply pinned-edge image stabilization, soft pinned-edge image stabilization, standard image stabilization, or a combination of techniques.

In one embodiment, the processing system 110 comprises a processor 112 and a memory 114. The memory 114 stores computer-executable program instructions for image stabilization. To perform the image stabilization functions described herein, the processor 112 loads program instructions from the memory 114 and executes the instructions. Alternatively, the processing system 110 could implement the image stabilization in hardware, firmware, or a combination of hardware, firmware, and/or software.

Standard Stabilization

Figure 2:
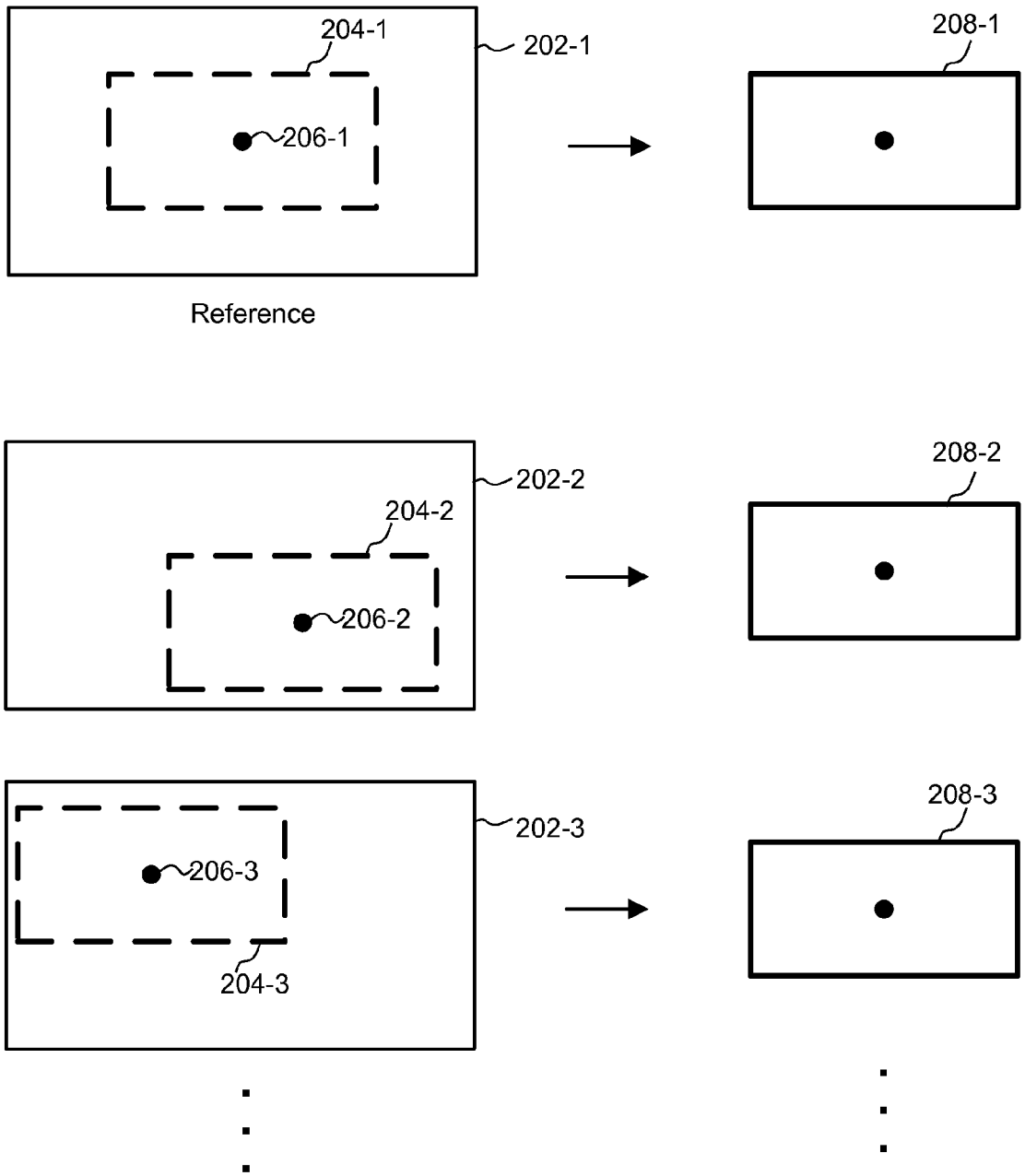
FIG. 2 is a diagram illustrating an embodiment of a standard image stabilization technique.

FIG. 2 is a diagram illustrating an embodiment of a standard image stabilization technique. Image buffer windows 202-1, 202-2, 202-3 (collectively referenced as image buffer windows 202 herein) represent the pixels captured by the image sensor 104 at various capture times and correspond to different frames of the captured video. In the standard image stabilization technique, the image buffer windows 202 have larger dimensions than the stabilized output video representing the desired field of interest. A reference field of interest 204-1 represents a subset of pixels of the image buffer window 202-1 and corresponds to the scene that will be depicted in the stabilized output video. The reference field of interest 204-1 includes a reference location 206-1 that will provide a stabilization reference for the stabilization process. In the one embodiment, the reference field of interest 204-1 centered within the image buffer window 202-1. Furthermore, in one embodiment, the reference location 206-1 represents a center of the image buffer window 202-1. The stabilization process acts to reduce depicted motion (e.g., improve or maintain stability) of the point in the scene that is depicted at the reference location 206-1. Thus, for example, a point on a stationary object depicted at the reference location 206-1 will ideally be stationary (e.g., remain centered or substantially centered) in each frame of the stabilized output video. If complete image stabilization cannot be achieved, image stabilization will still ensure that the reference location 206-1 remains closer to stationary (e.g., closer to centered) in the stabilized output video than in the un-stabilized video.

In the second captured image buffer window 202-2, the field of interest 204-2 is no longer centered in the image buffer window 202-2 but is offset to the bottom-right. This could be due to, for example, movement of the camera up and to the left in between capturing the reference image frame buffer 202-1 and the second image frame buffer 202-2. The point in the scene that was depicted at the reference pixel location 206-1 in the reference image frame buffer 202-1 is now depicted by pixels at a different pixel location 206-2. Similarly, in a third captured image buffer window 202-3, the field of interest 204-3 is now offset to the top-left due to, for example, camera movement down and to the right in between capturing the reference image frame buffer 202-1 and the third image frame buffer 202-3. The point in the scene that was depicted by pixels at the reference location 206-1 is now depicted by pixels at another different location 206-3.

To produce a stable output video, the image processing system 110 detects the locations 206-2, 206-3, that correspond to the point depicted at the reference location 206-1 and then determines the pixels corresponding to the fields of interest 204-2, 204-3 around the locations 206-2, 206-3 respectively. The pixels corresponding to the fields of interest 204-1, 204-2, 204-3 are then outputted to produce the stabilized output video frames 208-1, 208-2, 208-3 respectively, and the remaining pixels are discarded. Thus, in the stabilized output video, the fields of interest 208-1, 208-2, 208-3 appear stable and stationary objects will appear stationary.

A disadvantage of the above-described stabilization technique is that the image frame buffer 202 is significantly larger than the output video frames 208-1, 208-2, 208-3. This is often undesirable because capturing these extra pixels utilizes additional bandwidth and power.

Edge-Based Stabilization Techniques

In edge-based stabilization, a "pinned-edge" or "soft pinned edge" image stabilization technique is applied to compensate for unwanted camera motion in a captured video. In pinned-edge image stabilization, the final stabilized output video has the same dimensions as the pre-stabilized input buffer window captured by the image sensor. Thus, in pinned-edge image stabilization, it is not necessary to discard any of the captured pixels in order to achieve stabilization. In soft pinned-edge image stabilization, the pre-stabilized input buffer window has slightly larger dimensions than the stabilized output video but these larger dimensions are still reduced compared to traditional electronic image stabilization. Thus, in soft pinned-edge image stabilization, only a reduced number of captured pixels end up being discarded relative to traditional image stabilization. By reducing the number of extra pixels that are captured relative to the final output images, the pinned-edge and soft pinned-edge image stabilization system reduces bandwidth and power requirements of the image sensor and image processing system, thereby reducing overall cost and improving battery life without sacrificing performance.

Figure 3:
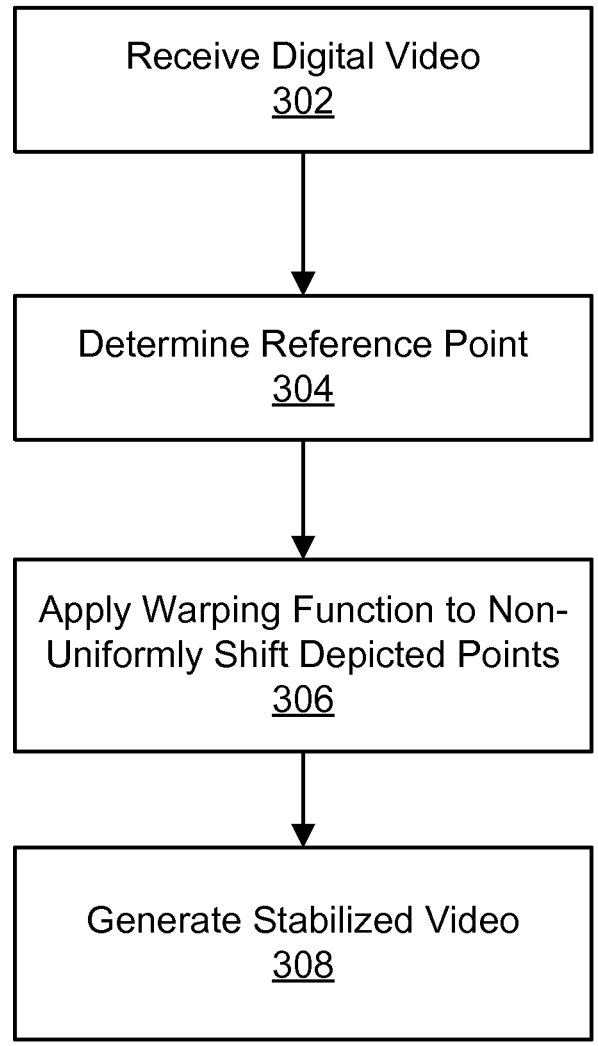
FIG. 3 is a flowchart illustrating an embodiment of an edge-based image stabilization process.

Turning to FIG. 3, it is a flowchart illustrating an example embodiment of a process for edge-based image stabilization (e.g., pinned edge or soft pinned-edge stabilization). Digital video is received 302 comprising a sequence of frames depicting a scene. The sequence of frames includes a reference frame and a second frame, which each depict a common plurality of depicted points in the scene. A reference point is determined 304 from the common plurality of points. The reference point corresponds to a point in the image that will be stabilized by the stabilization process, for example, by reducing depicted motion of this point between image frames). In one embodiment, the reference point comprises a point depicted at a predetermined pixel location (e.g., a center pixel) of a predetermined reference frame (e.g., a first frame). Alternatively, the reference point may be dynamically selected based on various characteristics of the video. For example, content recognition may be applied to the video and the reference point may be chosen as a point on a particular object (e.g., a center of a face, a point along a horizon or edge, etc.). The reference point corresponds to different pixel locations in the reference image and the second image (e.g., due to camera motion between capturing the images). A warping function 306 is applied to the second frame of the digital video to generate a warped second frame. The warping function warps the second frame such that depicted points of the depicted scene in the warped second frame are shifted non-uniformly relative to corresponding depicted points in the second image. Furthermore, applying the warping function decreases depicted movement of the reference point between the reference frame and the second frame, resulting in a stabilized image. Step 306 may be repeated for stabilizing additional frames with respect to the reference frame. Furthermore, in some instances a new reference point may be determined (step 304), either periodically or when certain conditions are met. Once the stabilized frames are produced, a stabilized video is generated 308 by combining the stabilized frames and reference frames into the appropriate sequence. It is noted that the processes described through FIGS. 2-3 may be embodied as instructions stored in the memory 114 or other computer-readable storage medium and executed by the processor 112 of the processing system 110. More detailed examples of pinned-edge and soft pinned-edge stabilization are described below.

Pinned-Edge Image Stabilization

Figure 4A:
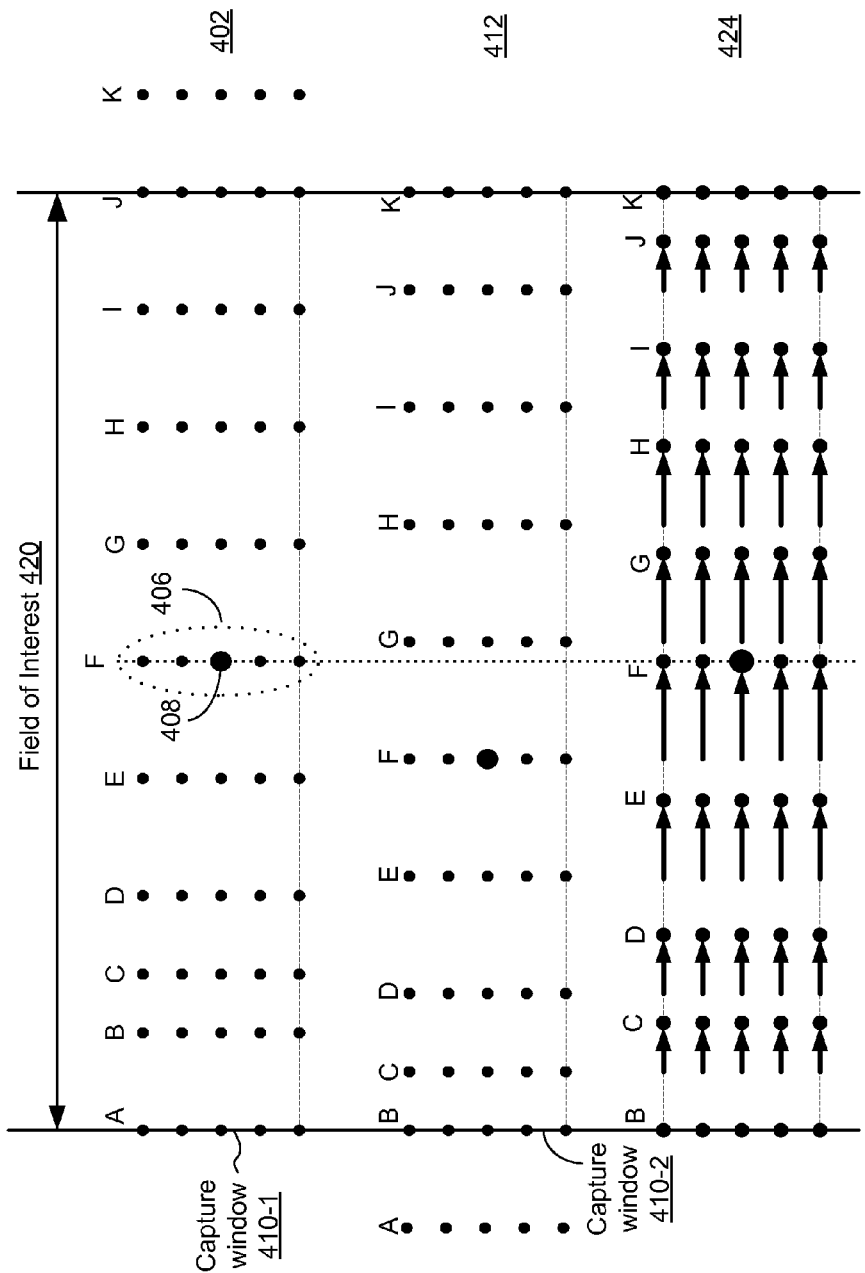
FIG. 4A is a diagram illustrating an embodiment of a pinned-edge image stabilization technique.

Referring to FIG. 4A, it is a diagram illustrating an example of a pinned-edge image stabilization technique to compensate for horizontal camera movement. A reference frame 402 comprises an array of pixel columns corresponding to various depicted points within a captured scene (e.g., points on the lines A-J). Column 406 is a reference column and includes a reference location 408. The pinned-edge image stabilization technique will operate so that a point in the scene depicted at the reference location 408 and the reference column 406 will have reduced motion (or remain stationary) in the stabilized output video relative to the unstabilized video. In the pinned-edge image stabilization technique of FIG. 4A, the capture buffer window 410-1 (the set of pixels that are captured by the camera) is of the same width as the field of interest 420 (the range of pixels that will be included in the final stabilized video). Thus, unlike the standard image stabilization technique of FIG. 2, no extra pixels are captured. For example, points in column K which are outside the field of interest are not captured in reference frame 402.

In a second captured frame 412, the depicted points are all horizontally shifted relative to the reference frame 402 due to horizontal camera motion. For example, if the camera moves horizontally to the right between capturing the reference frame 402 and capturing the second frame 412, then the depicted points will appear shifted to the left relative to where they appear in the reference frame 402. Furthermore, some depicted points from the reference frame 402 (e.g., those depicted along column A) are absent from the second frame 402 because they are now outside the capture window 410-2 of the image sensor 104 in the second frame 412. Furthermore, some additional points in the scene that were outside the capture window 410-1 of the reference frame 402 are now included in the second frame within the capture window 410-2 (e.g., the area to the right of line J such as column K).

To stabilize the second frame 412 relative to the reference frame 402, the image processing system 110 applies a non-uniform shift to the points of the second frame 412 so that the point at the reference location 408 will appear at the same location (e.g., centered) in a stabilized second frame 424 as it appeared in the reference frame 402. Thus, as seen in stabilized second frame 424 of the illustrated embodiment, the image processing system 110 shifts points of reference column F to the right by an amount appropriate to compensate for the shift appearing in second frame 412.

No shift is applied to points on the edges of the capture window 410-2 in the pinned-edge stabilization technique. Thus, pixels corresponding to column B remain at the left edge of the stabilized frame 424 and pixels corresponding to column K remain at the right edge of the stabilized frame 424 with no shift applied relative to frame 412. Points in between the left edge and the reference column F are shifted non-uniformly based on the horizontal distance between the edge and the reference point. For example, in one embodiment, the shift applied to a particular column is a linear function of the distance of the column from the left edge. In another embodiment, the shift applied to a particular column is a non-linear function of the distance of the column from the left edge. Similarly, points in between the right edge and the reference column F are shifted non-uniformly based on the horizontal distance between the edge and the reference point. This shift may similarly be a linear or non-linear function of the distance of the points from the right edge.

In one embodiment, the stabilization technique can be implemented by applying a warping function to the image that non-uniformly shifts depicted points. The image processing system 110 may implement the warping function by applying, for example, shift operations, blend operations, and/or interpolation operations on the underlying pixels depicting the points in the image. These operations are performed on the underlying pixels in a manner such that it appears that the points in the scene are shifted by an appropriate amount.

The result of the above-described stabilization technique can be understood by comparing the reference frame 402 to the stabilized second frame 424. As can be seen, in this example, the reference point 408 (and reference column F) is perfectly stabilized, i.e., the depicted points appear in the stabilized image precisely where they were in the reference frame 402 despite the movement of the camera before capturing second frame 412. However, the remaining columns (A-E and G-K) are not perfectly stabilized. For example, in column E there is a slight offset between where the points were depicted in the reference frame 402 and where they appear in the stabilized second frame 424. Thus, there is as small right-to-left movement of these points between the frames. This movement will increase for columns D-B, and the points in column A will appear to have moved off-screen in the stabilized frame 424. Similarly, on the right side of the reference column F, column G is slightly offset from where it appeared in the reference frame 402, which will results in a slight right-to-left movement of these points between frames. The movement will increase for columns H-J, and the points in column K which were outside the capture window 410-1 of the reference frame 402 are present in the stabilized second frame 424. Thus, stabilization improves with horizontal distance from the edges to the reference location.

Overall, this non-uniform destabilization may appear as a slight warping in the stabilized image frame 424 that increases near the edge. However, because the point of interest is generally centered in the image frame, this warping will generally not be noticeable if the camera movement is small, particularly in the case of wide angle cameras where some distortion is already naturally present from the lens. The benefit of this technique is that no extra pixels need be captured to perform stabilization, e.g., the captured windows 410-1, 410-2 are the same size as the field of interest 420 and all captured pixels in the second frame 412 are used in the stabilized frame 424.

Figure 4B:
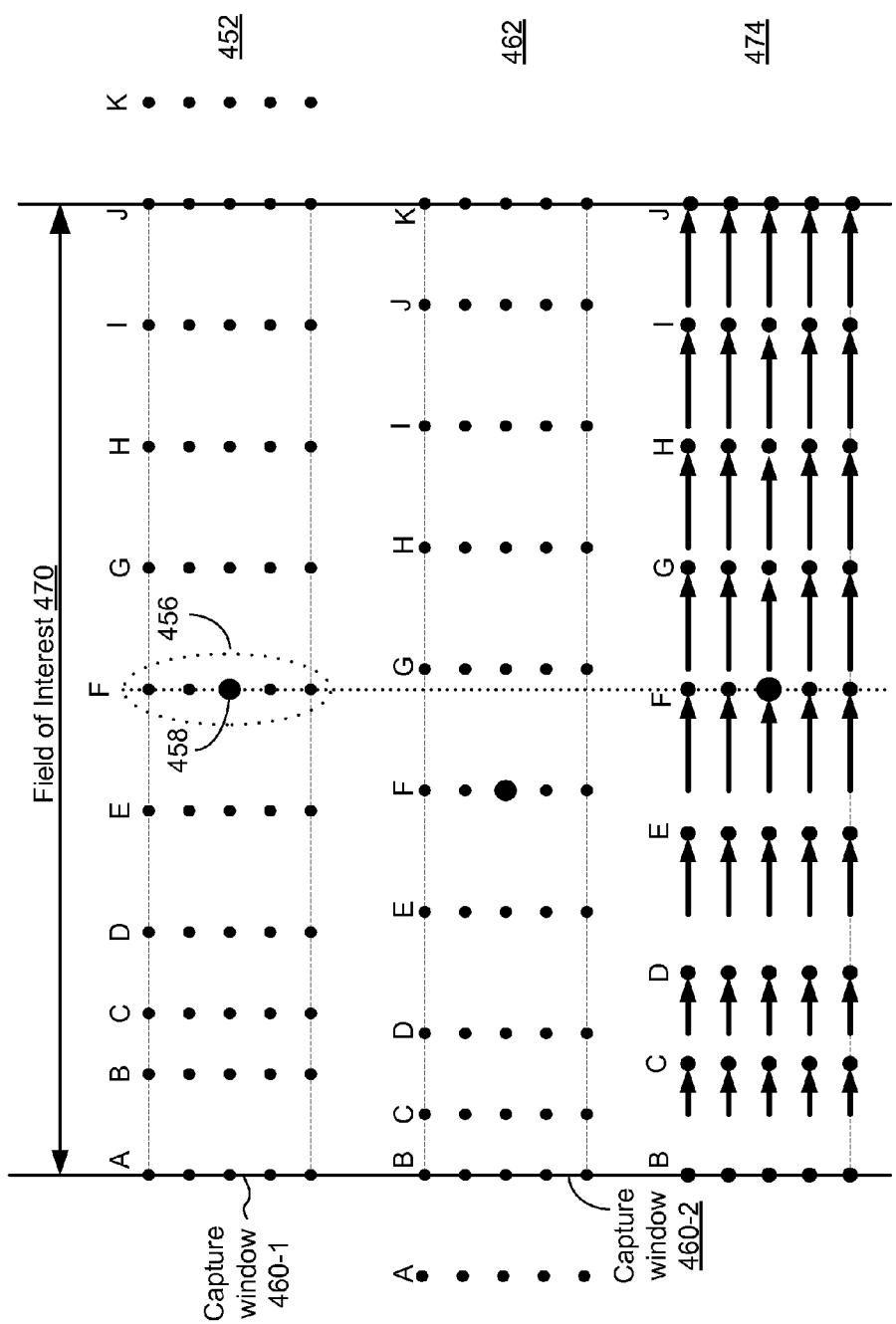
FIG. 4B is a diagram illustrating an embodiment of an asymmetric pinned-edge image stabilization technique.

FIG. 4B illustrates a variation of the pinned-edge stabilization technique in which asymmetric stabilization is applied. As in the example of FIG. 4A, a reference frame 452 is captured having a reference column 456 with a reference point 458 using a capture window 460-1 that is the same width as the field of interest 470. A second frame 462 is captured with the capture window 460-2 in which the captured points appear as being shifted to the left (e.g., due to left-to-right camera motion).

In the stabilized image frame 474, the reference column F and columns to the left (columns B-E) are shifted in the same manner described above. Points to the right of the reference column F are shifted by the same amount as the shift applied to the reference column F. If the shift would push points outside the window dimensions, these points are discarded, e.g., the pixels depicting points along column K are discarded in stabilized second frame 474. Thus, in this embodiment, columns F-J are all perfectly stabilized in that they appear at the same position as in the reference frame 452. Columns to the left of the reference column F are non-uniformly shifted resulting in a slight warping of the image. An advantage of the asymmetric stabilization depicted in FIG. 4B is that only half the image is warped. The trade-off here is that pixels to the right of column J (e.g., column K) captured in the second frame 462 are now discarded and thus, some captured pixels are wasted. However, because these points were not within the original field of interest 470 for the reference frame, they may not be of importance in the final video.

While FIGS. 4A-B illustrate a pinned-edge stabilization technique applied to compensate for left-to-right movement of the camera between first and second frames, the technique described above can be similarly applied to compensate for right-to-left movement of the camera between the frames by reversing the non-uniform shifting function. Similarly, the techniques described above can be similarly applied to vertical movement of the camera or combinations of horizontal and vertical movement. It is noted that the processes described in FIGS. 4A-B may be embodied as instructions stored in the memory 114 or other computer-readable storage medium and executed by the processor 112 of the processing system 110.

Soft Pinned-Edge Image Stabilization

Figure 5A:
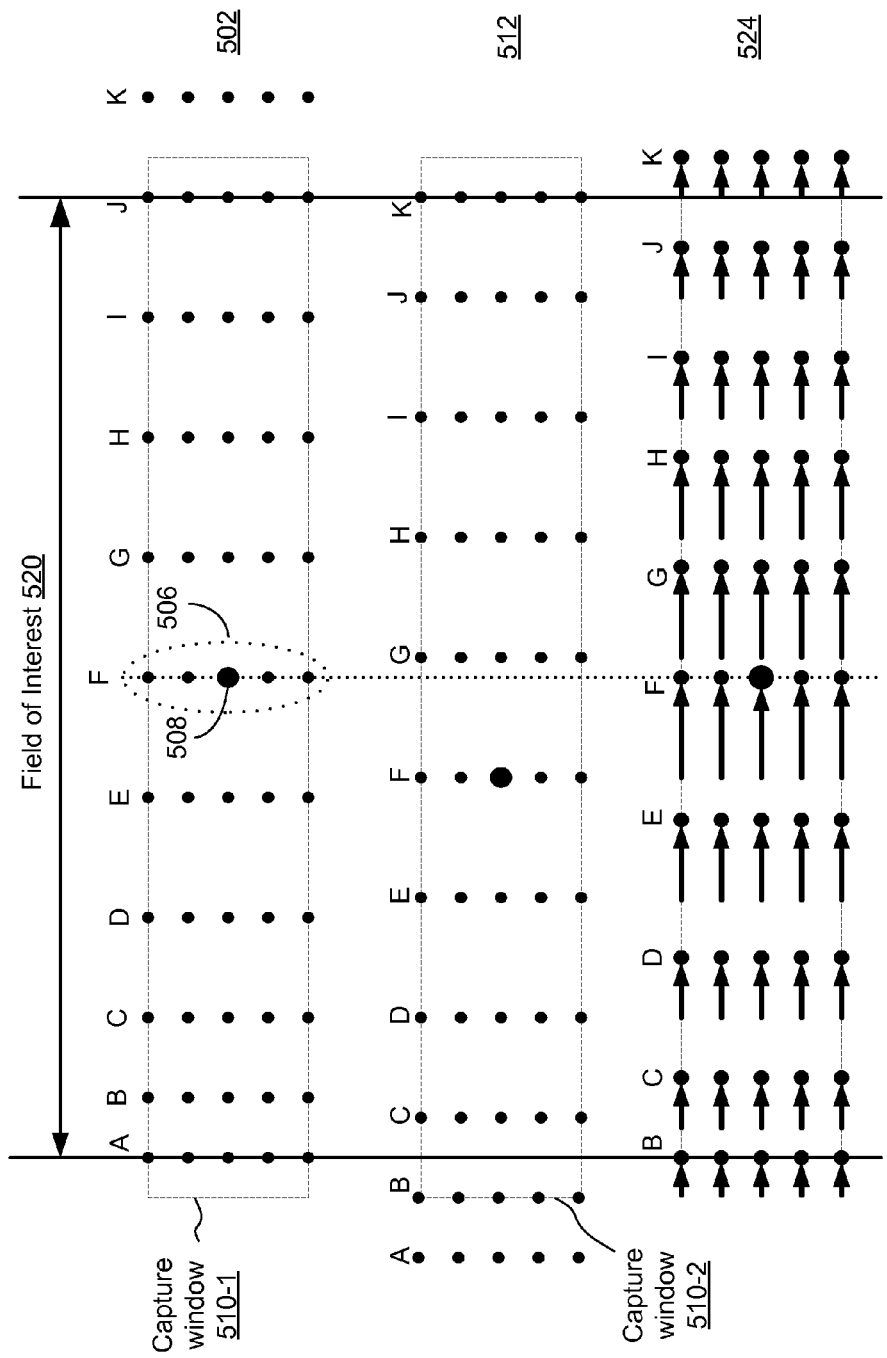
FIG. 5A is a diagram illustrating an embodiment of a soft pinned-edge image stabilization technique.

Next, FIG. 5A illustrates an example embodiment of a soft pinned-edge technique for image stabilization. Here, a reference frame 502 is captured having a plurality of columns including a reference column 506 having a reference point 508. In this embodiment, the capture buffer window 510-1 for the reference frame 502 is slightly wider in than the desired field of interest 520, e.g., some extra pixels are captured. As in the example above, a second frame 512 is captured in which the reference column 506 appears shifted to the left due to horizontal motion of the camera between capturing the first and second frames. Again, the capture window 510-2 is slightly wider than the field of interest 520. A non-uniform shift is applied to generate the stabilized second frame 524. This technique is similar to the pinned edge technique described above, except that the shift applied to the points along the edges of the capture window 510-2 is non-zero, and the shifts applied to the columns between the edges and the reference point are based on a non-uniform function (e.g., a linear or non-linear function). Thus, the extra pixels captured in second frame 512 outside the field of interest (e.g., column B) allow for some stabilization to still be applied to the edge of the frame 512 (e.g., column B is shifted to be closer to its location in the reference frame 502).

The soft pinned-edge stabilization technique described above offers a compromise between the pinned-edge technique described in FIG. 4A and the standard stabilization technique described in FIG. 2. Thus, the warping will be reduced relative to the pinned-edge technique, with the trade-off being that some extra pixels are captured, i.e., the captured frame 502, 512 are slightly larger than the stabilized second frame 522.

Figure 5B:
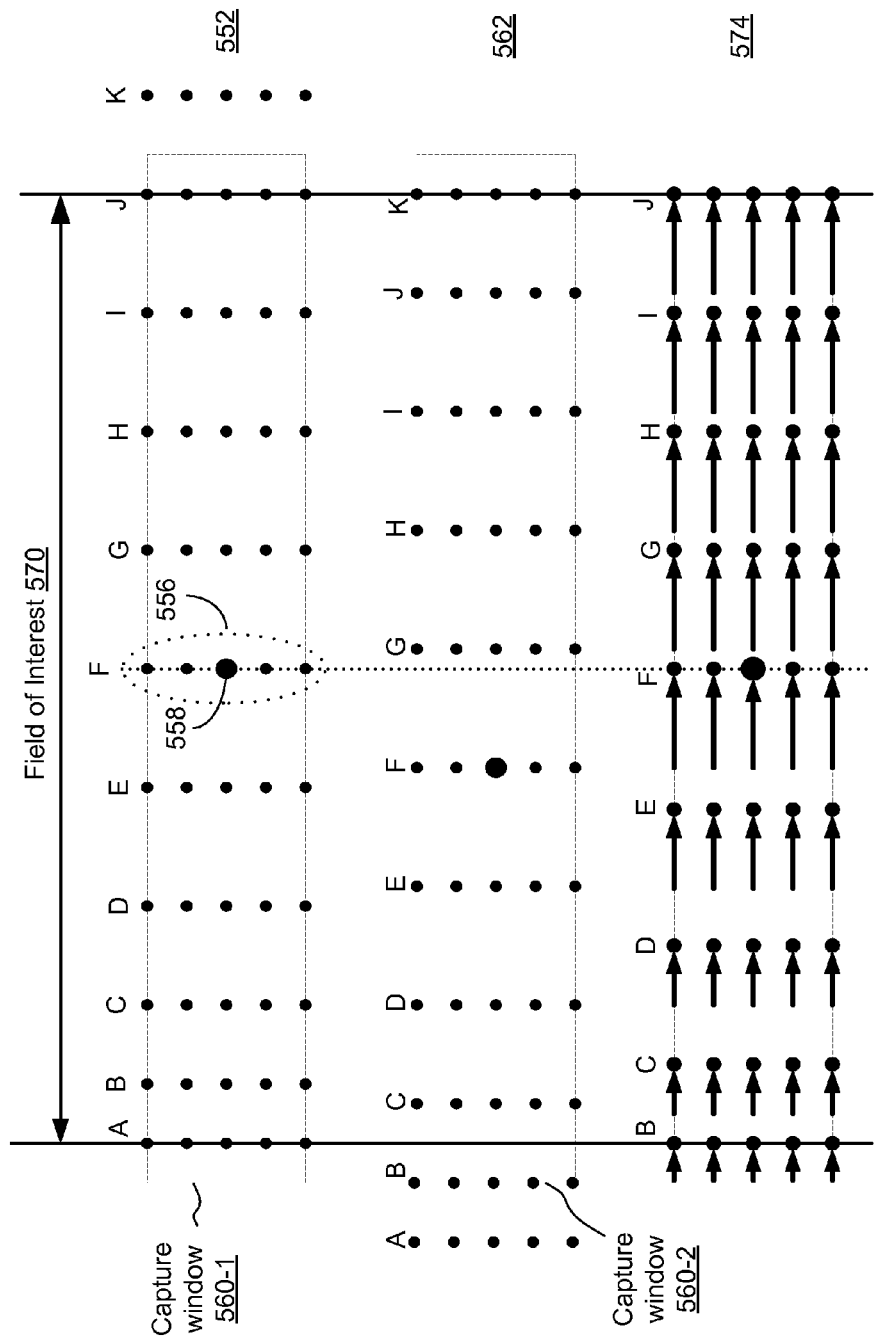
FIG. 5B is a diagram illustrating an embodiment of an asymmetric soft pinned-edge image stabilization technique.

FIG. 5B illustrates an asymmetric soft pinned-edge stabilization technique. As in the example of FIG. 5A, a reference frame 552 is captured having a reference column 556 with a reference point 558 using a capture window 560-1 that is the same width as the field of interest 570. A second frame 562 is captured with the capture window 560-2 in which the captured points appear as being shifted to the left (e.g., due to left-to-right camera motion).

In the stabilized image frame 574, the reference column F and columns to the left (columns B-E) are shifted in the same manner described above. Using the soft-pinned edge technique. Points to the right of the reference column F are shifted by the same amount as the shift applied to the reference column F. Thus, in this embodiment, only points to the left of the reference point 558 are warped, while the points to the right of the reference point 558 are uniformly shifted.

The soft pinned-edge stabilization of FIGS. 5A-B can be similarly applied to camera motion in different directions including either horizontal directions, either vertical directions, or both. It is noted that the processes described in FIG. 5A-B may be embodied as instructions stored in the memory 114 or other computer-readable storage medium and executed by the processor 112 of the processing system 110.

Multi-Dimensional Stabilization

Figure 6:
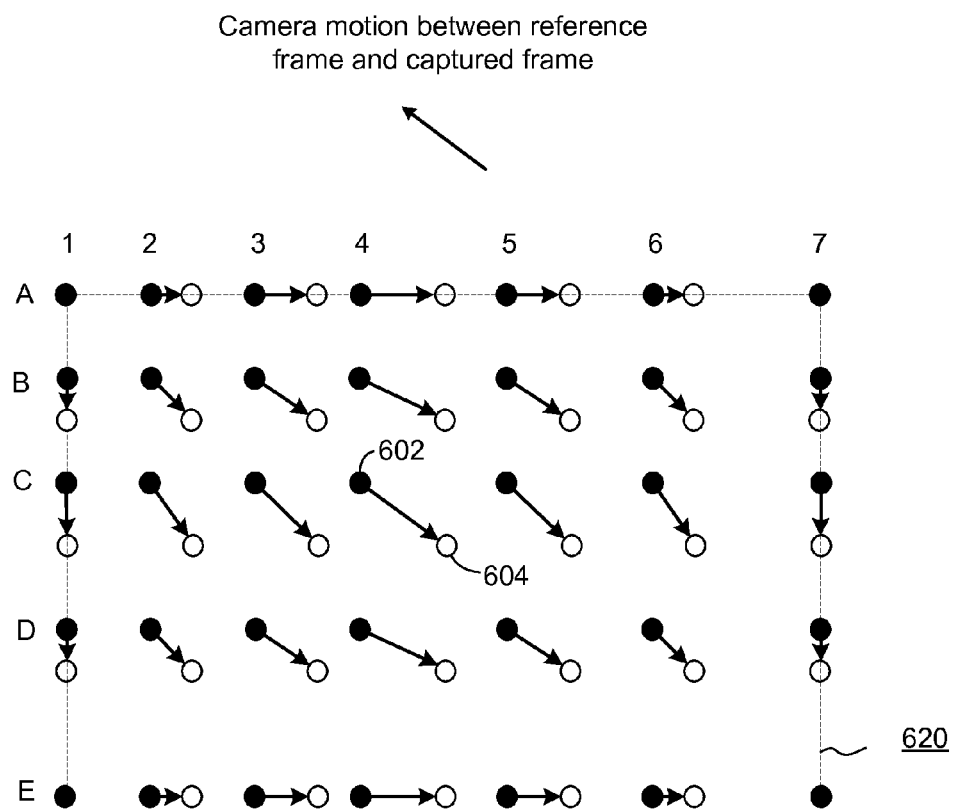
FIG. 6 is a diagram illustrating an embodiment of a two-dimensional edge-based image stabilization technique.

FIG. 6 illustrates an example two-dimensional pinned edge stabilization technique applied to compensate for two-dimensional movement of the camera between first and second frames. In the illustrated embodiment, the black circles represent the captured points in the second frame (based on capture window 620), while the white circles represent the shifted points in the stabilized image. Specifically, in the illustrated example, the stabilization compensates for movement of the camera up and to the left, although stabilization can be similarly applied for movement in other directions. Thus, to compensate for the camera movement and to stabilize the frame, a reference point 602 is shifted to a reference location 604 (e.g., a center of the capture window 620). In the vertical direction, no vertical shift is applied to the edge rows (e.g., rows A and E) and points in between the edges and the depicted reference point 602 are shifted non-uniformly in the vertical direction based on vertical distance from the respective edge (e.g., as a linear or non-linear functions of the vertical distance from the edge to the reference point). Similarly, in the horizontal direction, no horizontal shift is applied to the edge columns (e.g., columns 1 and 7), and points in between the edges and the depicted reference point 602 are shifted non-uniformly in the horizontal direction based on a horizontal distance from the respective edge to the reference point (e.g., as a linear or non-linear function of the horizontal distance from the edge to the reference point). As described above, the non-uniform shifting function may be implemented by applying shifts, interpolation, and/or blending of the underlying pixels in the captured second frame.

The techniques described above can be similarly applied to achieve two-dimensional soft pinned-edge stabilization. This technique works similarly to the pinned-edge technique described except that the component of the shift perpendicular to an edge is non-zero. Thus, some stabilization is still applied to the edges in the direction of movement. As explained above, soft pinned-edge stabilization is achieved by capturing some additional pixels around the frame of interest to enable a non-zero shift at the edge. Furthermore, asymmetric stabilization as described above with respect to FIGS. 4B and 5B can be extended to the two dimensional case by applying asymmetric shifts about the reference point in both the horizontal and vertical directions.

In another embodiment, a combination of stabilization techniques may be used. For example, a pinned-edge technique may be applied in a vertical direction and a soft pinned-edge technique may be applied in a horizontal direction (or vice versa). Alternatively, a standard stabilization technique may be used in one of the directions. Furthermore, different warping functions may be applied to achieve the stabilization in different directions. In yet another embodiment, a different function may be applied to account for forward or backward motion of the camera towards or away from the reference point. It is noted that the processes described in FIG. 6 may be embodied as instructions stored in the memory 114 or other computer-readable storage medium and executed by the processor 112 of the processing system 110.

Comparison of Stabilization Techniques

Figure 7:
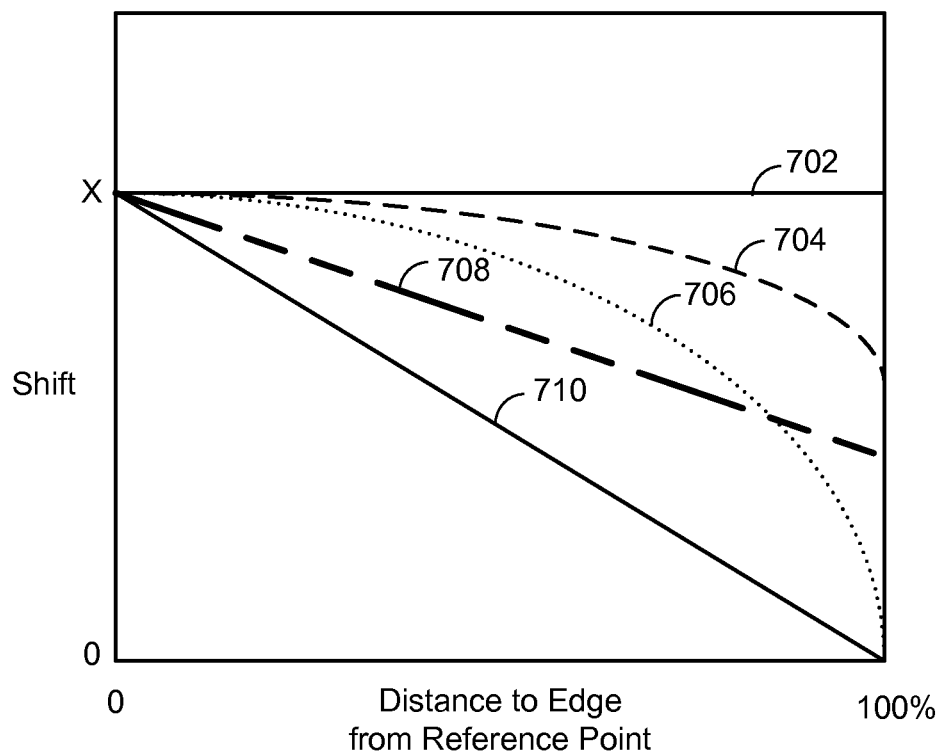
FIG. 7 is a graph illustrating a comparison between various stabilization techniques.

FIG. 7 is a graph comparing various stabilization techniques including standard stabilization (curve 702), non-linear soft pinned-edge stabilization (curve 704), non-linear pinned-edge stabilization (curve 706), linear soft pinned-edge stabilization (curve 708), and linear pinned-edge stabilization (curve 710). The graph shows the amount of shift applied to a particular point in the image as a function of its distance in a particular direction to an edge from the reference point, assuming a shift of X is applied to the reference point in the particular direction to make it appear stable. For example, in standard stabilization (curve 702), the shift is constant, e.g., the shift X is applied uniformly to all points. In the pinned-edge stabilization (curves 706, 710), a shift of X is applied to the reference point, while zero shift is applied at the edge. In between, the reference point and the edge, the amount of shift in a particular direction may be a linear function of the distance (curve 710) or a non-linear function of the distance (curve 706). In the soft pinned-edge stabilization (curves 704, 708), a shift of X is applied to the reference point, while some non-zero shift is applied at the edge. In between, the reference point and the edge, the amount of shift in a particular direction may be a linear function of the distance (curve 708) or a non-linear function of the distance (curve 704).

As described above the various types of stabilization each have different advantages and trade-offs, and the image stabilization system 100 may apply different stabilization techniques based on different desired traits of the stabilized output video.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a modular configurable camera system as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope.

The invention claimed is:

1. A method for stabilizing a digital video, the method comprising:
    receiving a reference video frame depicting a scene, the reference video frame depicting a reference point represented by one or more pixels at a reference pixel location;
    receiving a second frame depicting at least a portion of the scene, wherein movement of the reference point between the first and second frame results in the reference point being depicted at a different pixel location in the second frame;
    generating a stabilized second frame by non-uniformly shifting at least some points depicted in the second frame by an amount based on distances of the points from an edge of the second frame such that a greater shift is applied to non-edge points than edge points; and
    generating a stabilized video comprising a sequence of frames including the reference frame and the stabilized second frame, wherein depicted motion of the reference point between the first frame and the stabilized second frame is reduced relative to depicted motion of the reference point between the first frame and the second frame.

2. The method of claim 1, wherein non-uniformly shifting the at least some points comprises:
    applying zero shift to edge points depicted in the second frame.

3. The method of claim 1, wherein non-uniformly shifting the at least some points comprises:
    applying a non-zero shift to edge points depicted in the second frame.

4. The method of claim 1, wherein non-uniformly shifting the at least some points comprises applying a shift as a linear function of the distance.

5. The method of claim 1, wherein non-uniformly shifting the at least some points comprises applying a shift as a non-linear function of the distance.

6. The method of claim 1, wherein a field of view of the stabilized second frame has equivalent dimensions a field of view of the second frame as originally captured.

7. The method of claim 1, wherein a field of view of the stabilized second frame has smaller dimensions than a field of view of the second frame as originally captured.

8. A non-transitory computer-readable storage medium storing computer-executable instructions for stabilizing a digital video, the computer-executable instructions when executed by one more processors cause the one or more processors to perform steps including:
    receiving a reference video frame depicting a scene, the reference video frame depicting a reference point represented by one or more pixels at a reference pixel location;
    receiving a second frame depicting at least a portion of the scene, wherein movement of the reference point between the first and second frame results in the reference point being depicted at a different pixel location in the second frame;
    generating a stabilized second frame by non-uniformly shifting at least some points depicted in the second frame by an amount based on distances of the points from an edge of the second frame such that a greater shift is applied to non-edge points than edge points; and
    generating a stabilized video comprising a sequence of frames including the reference frame and the stabilized second frame, wherein depicted motion of the reference point between the first frame and the stabilized second frame is reduced relative to depicted motion of the reference point between the first frame and the second frame.

9. The non-transitory computer-readable storage medium of claim 8, wherein non-uniformly shifting the at least some points comprises:
    applying zero shift to edge points depicted in the second frame.

10. The non-transitory computer-readable storage medium of claim 8, wherein non-uniformly shifting the at least some points comprises:
    applying a non-zero shift to edge points depicted in the second frame.

11. The non-transitory computer-readable storage medium of claim 8, wherein non-uniformly shifting the at least some points comprises applying a shift as a linear function of the distance.

12. The non-transitory computer-readable storage medium of claim 8, wherein non-uniformly shifting the at least some points comprises applying a shift as a non-linear function of the distance.

13. The non-transitory computer-readable storage medium of claim 8, wherein a field of view of the stabilized second frame has equivalent dimensions a field of view of the second frame as originally captured.

14. The non-transitory computer-readable storage medium of claim 8, wherein a field of view of the stabilized second frame has smaller dimensions than a field of view of the second frame as originally captured.

15. A camera system for capturing and stabilizing digital video, the camera system comprising:
    a camera system for capturing digital video;
    one or more processors; and
    a computer-readable storage medium storing computer-executable instructions for stabilizing the digital video, the computer-executable instructions when executed by the one more processors cause the one or more processors to performs steps including:
        receiving a reference video frame depicting a scene, the reference video frame depicting a reference point represented by one or more pixels at a reference pixel location;
        receiving a second frame depicting at least a portion of the scene, wherein movement of the reference point between the first and second frame results in the reference point being depicted at a different pixel location in the second frame;

generating a stabilized second frame by non-uniformly shifting at least some points depicted in the second frame by an amount based on distances of the points from an edge of the second frame such that a greater shift is applied to non-edge points than edge points; and generating a stabilized video comprising a sequence of frames including the reference frame and the stabilized second frame, wherein depicted motion of the reference point between the first frame and the stabilized second frame is reduced relative to depicted motion of the reference point between the first frame and the second frame.

16. The camera system of claim 15, wherein non-uniformly shifting the at least some points comprises:
applying zero shift to edge points depicted in the second frame.

17. The camera system of claim 15, wherein non-uniformly shifting the at least some points comprises:
applying a non-zero shift to edge points depicted in the second frame.

18. The camera system of claim 15, wherein non-uniformly shifting the at least some points comprises applying a shift as a linear function of the distance.

19. The camera system of claim 15, wherein non-uniformly shifting the at least some points comprises applying a shift as a non-linear function of the distance.

20. The camera system of claim 15, wherein a field of view of the stabilized second frame has equivalent dimensions a field of view of the second frame as originally captured.

21. The camera system of claim 15, wherein a field of view of the stabilized second frame has smaller dimensions than a field of view of the second frame as originally captured.

* * * * *